United States Patent [19]  
Clampitt et al.

[11] Patent Number: 4,514,308  
[45] Date of Patent: Apr. 30, 1985

[54] SULFONATED ASPHALT

[76] Inventors: Richard L. Clampitt; Jeffrey A. Russell, both c/o Phillips Petroleum Company, Bartlesville, Okla. 74004

[21] Appl. No.: 518,703

[22] Filed: Jul. 29, 1983

[51] Int. Cl.[3] .................. C08L 25/10; C08L 53/02; C08L 95/00
[52] U.S. Cl. .................. 252/8.5 C; 252/8.5 M; 252/8.5 P; 252/8.5 LC; 523/130; 523/131; 524/59; 524/60; 524/64; 524/68
[58] Field of Search .............. 252/8.5, 8.5 C; 524/596, 64, 68; 523/130, 131; 525/54.5

[56] References Cited

U.S. PATENT DOCUMENTS

| | | | |
|---|---|---|---|
| 3,028,333 | 4/1962 | Stratton | 252/8.5 |
| 3,070,165 | 12/1962 | Stratton | 166/42 |
| 3,089,842 | 5/1963 | Stratton | 268/44 |
| 3,173,800 | 3/1965 | Wilson | 106/274 |
| 3,215,628 | 11/1965 | Peacock | 252/8.5 |
| 3,554,911 | 1/1971 | Schiff et al. | 252/59 |
| 4,351,750 | 9/1982 | Ferm et al. | 524/60 |
| 4,390,474 | 6/1983 | Nussbaum et al. | 252/8.5 D |
| 4,425,462 | 1/1984 | Turner et al. | 252/8.5 C |
| 4,460,723 | 7/1984 | Rollmann | 524/59 |

Primary Examiner—Allan M. Lieberman

[57] ABSTRACT

Sulfonated asphalt/hydrogenated conjugated diene-monovinyl aromatic copolymer compositions, preparations thereof, and use in well working fluid compositions.

11 Claims, No Drawings

SULFONATED ASPHALT

This invention relates to sulfonated asphalt compositions and to well-working fluids containing the same. In one aspect it relates to the preparation of a sulfonated blend of asphalt and a hydrogenated conjugated diene-monovinyl aromatic copolymer. In another aspect this invention relates to a process for the sulfonation of a blend of asphalt and a hydrogenated conjugated diene-monovinyl aromatic copolymer. In another aspect it relates to drilling fluids such as the water based, oil based and emulsion types used in drilling oil and gas wells, and other deep wells utilizing as part of the drilling fluid a sulfonated asphalt/hydrogenated conjugated diene-vinylarene copolymer composition. In a further aspect it relates to a method of drilling boreholes with drilling fluids, the latter being characterized by desirably low fluid loss in the presence of metal ions and possessing generally desirable rheological properties. In still another aspect, the invention relates to a novel composition of matter which has particular utility as a drilling fluid additive and to a method for its preparation.

It is well-known that in perforating the earthen formations to tap subterranean deposits, such as gas or oil, that perforation is accomplished by well drilling tools and a drilling fluid. Drilling fluid serves to cool and lubricate the drill bits, to carry the cuttings to the surface as the drilling fluid is circulated in and out of the well, to support at least part of the weight of the drilling pipe and drill bit, to provide a hydrostatic pressure head to prevent caving of the walls of the well bore, to deposit on the surface of the well bore a filter cake which acts as a thin, semi-impervious layer to prevent undue passage therethrough of drilling fluids, and to perform other functions as are well-known in the drilling art. It is important that the drilling fluid exhibit a relatively low rate of filtration or fluid loss in addition to having desirable, rheological properties, such as low viscosity and gel strength.

In addition to having desirable rheological properties, such as low viscosity and gel strength, it is important that the drilling fluid exhibit a low rate of filtration or fluid loss, that is, the drilling fluid should permit little, if any, loss of its liquid phase to the formation penetrated, as is well-known to those skilled in the art.

Most drilling fluids contain additives and conditioning agents which are important in determining the fluid loss properties of the drilling fluid, as well as inhibiting shale and clay disintegration. One such material is sulfonated asphalt. Although sulfonated asphalt has many desirable properties in improving the rheological properties of drilling fluids, there still remains room for improvement in this conditioning agent. In accordance with the present invention, an improved sulfonated asphalt is provided for use in well working fluids.

Accordingly an object of this invention is to provide a novel drilling fluid.

Another object is to provide an improved method of drilling oil and gas wells or other deep wells using a novel drilling fluid.

Another object of this invention is to provide a novel drilling fluid, such as the water based, oil based or emulsion types characterized by desirable viscosity, gel strength, fluid loss and other desirable rheological properties.

Another object of this invention is to provide novel sulfonated asphalts.

Another object of this invention is to provide a method for producing said novel sulfonated asphalt.

Other objects, aspects, as well as the several advantages of the invention will become apparent to those skilled in the art upon reading the specification and the appended claims.

Broadly, according to the invention, an improved sulfonated asphalt is provided comprising a sulfonated blend of asphalt and a hydrogenated conjugated diene-monovinyl aromatic copolymer.

In accordance with one embodiment of the invention, it has been found that improved well working fluids can be provided comprising a fluid medium and a small but sufficient amount of a sulfonated blend of asphalt and a hydrogenated conjugated diene-monovinyl aromatic copolymer to improve the physical properties of the drilling fluid.

Another embodiment of the invention comprises water and oil dispersible ammonium or alkaline metal salts of sulfonated asphalts prepared from a sulfonatable feedstock comprising a blend of asphalt and a hydrogenated conjugated diene-monovinyl aromatic copolymer which sulfonated blend of asphalt and copolymer can be effectively employed in well working fluids, especially water based drilling fluids.

In another embodiment of the invention, the sulfonated asphalt materials are prepared by sulfonating a mixture of asphalt and a hydrogenated conjugated diene-monovinyl aromatic copolymer with a sulfonating agent such as liquid sulfur trioxide, or the like, neutralizing the resulting sulfonic acids, and recovering sulfonated asphalt as a product of the process. Neutralization of said sulfonic acids with sodium hydroxide yields water and oil-soluble or dispersible ammonium or alkali metal salts of the sulfonated asphalt hydrogenated conjugated diene-monovinyl aromatic copolymer blend.

Preparation of the sulfonates of this invention can be carried out in a number of ways. For example, the blend of asphaltic material and hydrogenated conjugated diene-monovinyl aromatic copolymer can be dissolved in a suitable nonsulfonatable diluent, such as liquid sulfur dioxide, carbon tetrachloride, chloroform, pentane, n-hexane, octanes, gasoline, kerosene, cyclohexane, diesel fuel and the like. A particularly suitable diluent in many cases, especially for the sulfonating agent sulfur trioxide, is n-hexane. Diluent can be added to the blend of asphaltic material and copolymer before the sulfonation reaction and further amounts can be added after sulfonation if such is desired. The diluent can be separated from the sulfonation product by distillation, simple heating, or extraction with suitable solvents.

The sulfonatable feedstock blend of asphalt and hydrogenated conjugated diene monovinyl aromatic copolymer can contain from about 10:1 to about 5:1 parts by weight of asphalt to parts by weight of hydrogenated copolymer.

The term "asphalt" or "asphaltic material" as used in this disclosure is meant to cover dark brown to black solid or semi-solid cementatious hydrocarbon material which is completely or substantially soluble in carbon disulfide in which material bitumens are the sole or predominant constituent, these materials occurring in nature as such or being obtained by refining petroleum, by distillation, precipitation, cracking, oxidation, or similar operations. Asphaltic materials useful in preparing the sulfonates of this invention representively include asphaltenes, maltenes, blown asphalt, straight residual oils, distillation residues, still bottoms, cracking residues, asphaltic bitumens and the like. The asphalt will usually be obtained in the step of deasphalting bitumens and the like. The asphalt will usually be obtained in the step of deasphalting reduced crude stocks in the refining of petroleum which contains highly oxidized asphaltenes with a softening point between about 190°–250° F., penetration <10.

The sulfonatable conjugated diene-monovinyl aromatic copolymers useful in this invention include random copolymers, block copolymers and the like that are well-known in the rubber art. The copolymers of the present invention can be prepared by any of the conventional techniques known in the art, such as those described in U.S. Pat. Nos. 2,975,160, 3,595,942, 3,639,517, and 4,091,053, all of which are incorporated herein by reference.

The hydrogenation of the copolymer can be carried out in any manner known in the art, such as by the process of U.S. Pat. Nos. 2,864,809, 3,113,986, and 4,088,626, all of which are incorporated herein by reference. The hydrogenated conjugated diene-monovinyl aromatic copolymers of the present invention are polymers which have been sufficiently hydrogenated to remove substantially all of the olefinic unsaturation, leaving only the aromatic, i.e., phenyl group unsaturation. The extent of hydrogenation of the olefinic bonds and the phenyl groups in the copolymer can be determined by infrared analysis before and after hydrogenation.

The copolymers of the invention generally will contain a major proportion of monovinyl aromatic with the balance being conjugated diene. Preferred copolymers comprise butadiene and styrene with butadiene comprising about 30–50 weight parts with styrene making up the balance.

A most preferred hydrogenated copolymer comprises hydrogenated butadiene/styrene copolymer in a ratio of 40 parts butadiene to 60 parts styrene.

The mixture of asphalt and hydrogenated conjugated diene-monovinyl aromatic copolymer can be sulfonated by any of the conventional techniques known in the art, such as those described in U.S. Pat. No. 3,215,628 which is incorporated herein by reference. For example, a mixture of asphalt and a hydrogenated conjugated diene-monovinyl aromatic copolymer is contacted with a sulfonating agent dispersed in a normally liquid inert low boiling diluent, for example, a paraffinic hydrocarbon and then neutralizing the resulting sulfonation mixture with an alkaline neutralizing agent, and recovering the resulting neutralized product. In the sulfonation process, the asphalt/hydrogenated copolymer dispersion is passed to a suitable sulfonation zone where it is sulfonated, e.g., in the liquid phase with liquid sulfur trioxide. Sulfonation temperatures that can be used may range from about 30° C. to about 40° C. although sulfonation can be accomplished at temperatures in the broad range of about 20° C. to about 45° C.

The reaction mixture comprising sulfonic acids and diluent can be neutralized directly by adding thereto an alkaline compound, such as ammonium hydroxide or carbonate, an alkali metal or alkaline earth metal compound such as sodium hydroxide, calcium hydroxide, or barium hydroxide or the corresponding metal carbonates.

After the neutralization step, the sulfonated asphalt/copolymer blends can be allowed to settle and then separated by any conventional method, such as decantation, filtration, centrifugation, or evaporation to remove therefrom the diluent. Recovered sulfonated product can then be dried and ground to produce the drilling mud additive of the invention.

The well working fluids, especially the drilling fluids of this invention, can be prepared by any conventional method. The amount of sulfonated asphalt, water, clay and oil, or other components employed is dependent upon several variables such as the nature of the sulfonated asphalt, the density of the drilling fluid desired, the nature of the formation penetrated, and other factors which can be readily determined by those skilled in the art customary in rotary oil drilling operations.

Generally, the amount of sulfonated asphalt of the invention employed will be that sufficient to form a relatively thin, impervious filter cake on the wall of the borehole and in an amount that will impart sufficient viscosity and gel strength properties to the drilling fluid in order that it may be readily pumped and circulated and, also, in an amount that will reduce the coefficient of friction (reduce torque and drag) between the metal drilling pipe and the earthen well bore to a satisfactorily low level. In addition, the amount of sulfonated asphalt/copolymer blend present will impart sufficient inhibition to the disintegration of shales and clays. In addition, the sulfonated asphalt/rubber compositions of the invention are effective in controlling foam. Generally, the amount of sulfonated asphalt added to the drilling fluid will be in the range of about 1.0 to about 10 pounds per barrel (42 U.S. gallons) of drilling fluid.

Although the drilling fluids or well working fluids of this invention need only contain the water dispersible and oil dispersible sulfonated blend of asphalt and hydrogenated copolymer as the material necessary to obtain the desirable rheological properties of the drilling fluid, it is within the scope of this invention to add clays or other finely divided inorganic solids. Other materials which can be included, such as materials commonly used for weighting purposes include finely divided limestone, barite, lead sulfide, and the like. For the emulsion systems any suitable conventional emulsifying agent, such as the alkali and alkaline earth metal salts of sulfonatable oils including vegetable oils, wood oils, fish oils, and the like can be employed.

The following examples and discussions are illustrative of this invention and specific details for preparing the sulfonated asphalt and drilling fluids of this invention included therein are merely illustrative of preferred embodiments thereof and are not to be construed as unduly limiting this invention.

EXAMPLE I

This example describes the preparation of an inventive sulfonated asphalt drilling mud additive by using a sulfonatable feedstock comprising a blend of hydrogenated butadiene/styrene copolymer and asphalt. A representative preparation is described below.

A charge of 150 g asphalt (softening point of about 190°–250° F., penetration 1–3 @ 77° F.), 15 g hydrogenated butadiene/styrene (40/60) copolymer and 800 mL n-hexane was placed in a two-liter glass reactor. The mixture was cooled to 25° C. in a circulating water bath and 45 mL of liquid sulfur trioxide were added dropwise to the well-stirred mixture at a rate of approximately 0.66 milliliter per minute. After all of the sulfonating agent had been added, the stirred mixture was allowed to react for about 45 minutes. A 50 percent aqueous sodium hydroxide neutralizing solution was then added to the stirred mixture in an amount equivalent to one gram of sodium hydroxide for each milliliter of sulfur trioxide used (pH adjusted to ca 9.5). The slurry was processed on a drum drier and the residue was isolated as free flowing flakes. An aqueous mixture of these flakes exhibited a pH of about 10–10.5.

In the above preparation and two additional preparations, the weight ratio of asphalt to copolymer was 10:1 but the amount of liquid $SO_3$ was, respectively, 42 mL, 45 mL and 48 mL. Thus, a summary of the materials charged to the three preparations follows:

| Run 1 | Run 2 | Run 3 |
|---|---|---|
| 150 g Asphalt | 150 g Asphalt | 150 g Asphalt |
| 800 mL n-Hexane | 800 mL n-Hexane | 800 mL n-Hexane |
| 15 g Copolymer | 15 g Copolymer | 15 g Copolymer |
| 42 mL $SO_{3(l)}$ | 45 mL $SO_{3(l)}$ | 48 mL $SO_{3(l)}$ |

It is evident that the only difference in the three runs was the amount of liquid sulfur trioxide used.

EXAMPLE II

The material prepared in accordance with run 2 of Example I was used for high temperature-high pressure water loss tests in this Example and the results are summarized below.

TABLE I

HIGH TEMPERATURE-HIGH PRESSURE WATER LOSS TESTS (6 lb/bbl SULFONATED ASPHALT/COPOLYMER ADDITIVE)

| Run No. | Type of Run | PV | YP | Gels | Water Loss (mL/30 min) Room Temp. | HTHP* |
|---|---|---|---|---|---|---|
| 4 | Invention | 26 | 3 | 5/20 | — | 23.0 |
| 5 | Invention | 16 | 4 | 4/31 | — | 21.8 |
| 6 | Control[a] | 29 | 17 | 5/21 | 5.1 | 19.4 |
| 7 | Control[b] | 30 | 10 | 3/14 | 5.4 | 18.8 |
| 8 | Control[c] | 28 | 11 | 5/22 | 5.7 | 18.0 |
| 9 | Base Mud** | 19 | 7 | 1/7 | 7.4 | 33.8 |

*High Temperature-High Pressure test conditions: 500 psi and 300 F.
**Base mud contained 20 wt % kaolin and 4 wt % bentonite in distilled water.
[a]The standard SOLTEX ® product from the Conroe, Texas plant was used in this control run.
[b]A laboratory sample of sulfonated asphalt was used in this control run.
[c]An additional laboratory sample of sulfonated asphalt (using a different available asphalt) was used in this control run.

Referring to the high temperature-high pressure water loss values in runs 4 through 8 relative to the result in run 9, it is evident that the sulfonated additives improve water loss. In regard to the inventive runs 4 and 5 relative to the control runs 6, 7 and 8 it is evident that the inventive sulfonated additives are comparable to SOLTEX ® in controlling high temperature-high pressure water loss. Attention is called to the relatively low yield point values and plastic viscosity values in the inventive runs 4 and 5 compared to the higher values for the control runs 6, 7 and 8. These results indicate the superior capacity of the inventive system to inhibit the kaolin clay.

EXAMPLE III

The material prepared in accordance with run 2 of Example I was used for foam tests in this Example (see runs 10–12) and the results are summarized below.

TABLE II

FOAM TESTS (6 lb/bbl SULFONATED ASPHALT/COPOLYMER ADDITIVE)

| Run No. | Type of Run | Foam Index[a] Initial | Foam Index[a] One Hour | Foam Factor[b] Initial | Foam Factor[b] One Hour |
|---|---|---|---|---|---|
| 10 | Invention | 285 | 280 | 1.63 | 1.60 |
| 11 | Invention | 310 | 310 | 1.77 | 1.77 |
| 12 | Invention | 270 | 270 | 1.54 | 1.54 |
| 13 | Control[c] | 350 | 310 | 2.00 | 1.77 |
| 14 | Control[d] | 425 | 415 | 2.42 | 2.37 |
| 15 | Control[e] | 370 | 355 | 2.11 | 2.03 |
| 16 | Base Mud** | 175 | 175 | 1.00 | 1.00 |

[a]Foam Index is the volume (mL) of mud and foam with 3 g sulfonated additive in 175 mL of base mud.
[b]Foam Factor is defined as the Foam Index divided by 175.
[c]Laboratory sample of sulfonated asphalt
[d]Plant sample of sulfonated asphalt
[e]Plant sample of sulfonated asphalt
**Base mud contained 7 lb/bbl bentonite, 1 lb/bbl quebracho, 0.25 lb/bbl NaOH and 60 lb/bbl P95 Rotary clay in deionized water.

Referring to the results in Table II, it is evident that the inventive sulfonated additives (runs 10–12) were more effective in controlling foam than the control samples (runs 13–15) of sulfonated asphalt. The base mud (run 16) exhibited essentially no capacity to foam.

EXAMPLE IV

The material prepared in accordance with run 2 of Example I was used for clay inhibition tests and the results are summarized in Table III.

TABLE III

CLAY INHIBITOR TESTS

| Run No. | Type of Run | PV | YP | Gels | % Reduction* PV | % Reduction* YP |
|---|---|---|---|---|---|---|
| 17 | Invention | 25 | 26 | 18/50 | 44.4 | 62.9 |
| 18 | Invention | 28 | 32 | 20/55 | 37.7 | 54.3 |
| 19 | Control[a] | 26 | 30 | 16/52 | 38.1 | 52.4 |
| 20 | Control[b] | 26 | 31 | 24/56 | 38.1 | 50.8 |
| 21 | Control[c] | 24 | 31 | 18/52 | 42.9 | 50.8 |
| 22 | Base Mud | 42 | 63 | 12/45 | | |

*These results reflect the % reduction of PV and YP values of the base mud compared to values for the systems of runs 17–21
[a]Plant sample of sulfonated asphalt
[b]Laboratory sample of sulfonated asphalt
[c]Laboratory sample of sulfonated asphalt Referring to the results in Table III, it is apparent that the systems of inventive runs 17 and 18 inhibited clay and shale as well as the control systems of runs 19–21. The % reduction in plastic viscosity and yield points for the inventive runs 17 and 18 (average values, respectively, 41 and 58.6) compare favorably with the analogous values for the control systems of runs 19–21 (average values, respectively, 39.7 and 51.3). In general, the inventive compositions used in runs 17 and 18 were slightly superior in clay inhibition to the control compositions used in runs 19–21.

What is claimed is:

1. A well working fluid comprising a fluid medium and a sulfonated blend of from about 10:1 to about 5:1 parts by weight of asphalt to parts by weight of a hydrogenated conjugated diene-monovinyl aromatic copolymer substantially free of olefinic unstauration and wherein said copolymer contains a major proportion of monovinyl aromatic, said sulfonated blend being dispersed in said fluid medium and present in an amount sufficient to reduce the filtration loss of said well working fluid and inhibit shale and clay disintegration.

2. The well working fluid according to claim 1 wherein said copolymer is a hydrogenated butadiene/styrene copolymer.

3. A composition according to claim 1 wherein said sulfonated blend is an alkali metal salt of said sulfonate and said well working fluid is a water based drilling fluid composition comprising water and a sulfonated blend of asphalt and a hydrogenated conjugated diene-monovinyl aromatic copolymer.

4. A composition according to claim 3 wherein said copolymer is a hydrogenated butadiene/styrene copolymer.

5. A composition according to claim 3 wherein said sulfonated blend is an alkali metal salt sulfonate.

6. A composition according to claim 5 wherein said alkali metal salt is a sodium salt.

7. A composition according to claim 4 wherein the amount of sulfonated blend added to the drilling fluid ranges from about 1.0 to about 10 pounds per barrel of drilling fluid.

8. A process for producing a sulfonated asphalt which comprises sulfonating a feedstock blend of from about 10:1 to 5:1 parts by weight of asphalt to parts by weight of a hydrogenated conjugated diene-monovinyl aromatic copolymer containing a major proportion of monovinyl aromatic and which copolymer is substantially free of olefinic unsaturation with a sulfonating agent, neutralizing the resulting sulfonic acids with an alkaline neutralizing agent, separating the resulting sulfonated product, and drying the resulting separated sulfonated asphalt product.

9. A process according to claim 8 wherein said copolymer is a hydrogenated butadiene/styrene copolymer.

10. A process according to claim 8 wherein said sulfonic acids are neutralized with an alkali metal hydroxide.

11. A process according to claim 10 wherein said alkali metal is sodium.

* * * * *

UNITED STATES PATENT AND TRADEMARK OFFICE
CERTIFICATE OF CORRECTION

PATENT NO. : 4,514,308

DATED : April 30, 1985

INVENTOR(S) : Richard L. Clampitt and Jeffrey A. Russell

It is certified that error appears in the above-identified patent and that said Letters Patent is hereby corrected as shown below:

On the title page;

Assignee should be: Phillips Petroleum Company
Bartlesville, Oklahoma

Signed and Sealed this

Twenty-seventh Day of August 1985

[SEAL]

Attest:

DONALD J. QUIGG

Attesting Officer     Acting Commissioner of Patents and Trademarks